April 16, 1935. S. J. POPLAWSKI 1,997,873
DRINK MIXER
Filed Oct. 12, 1933
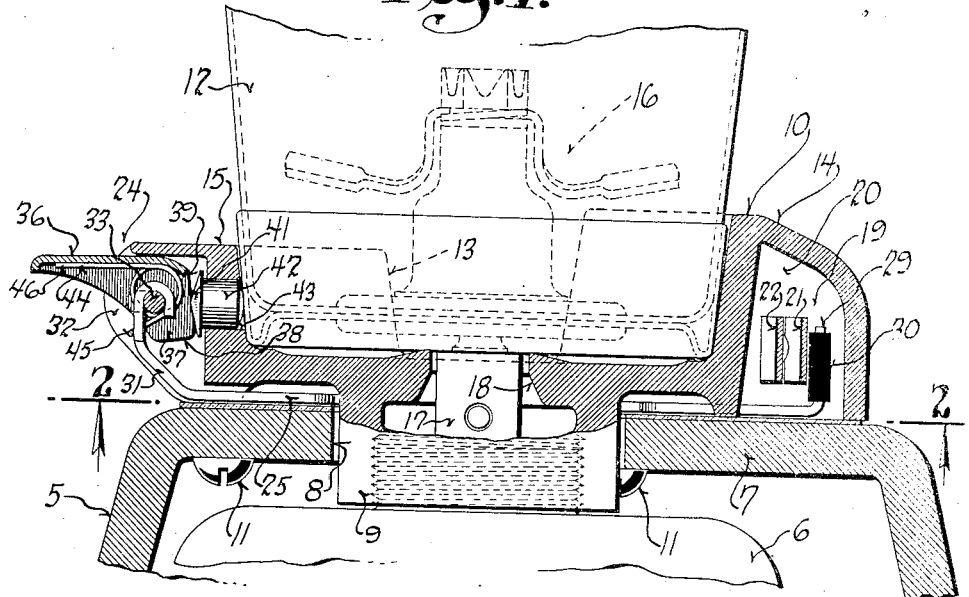
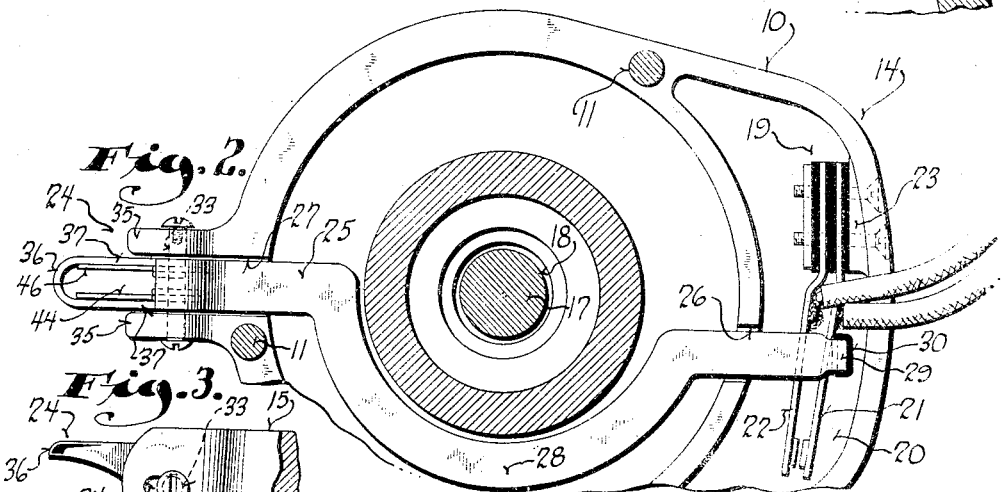
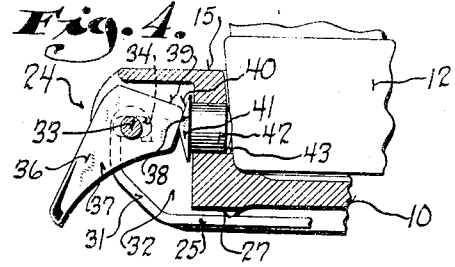
Inventor
Stephen J. Poplawski
By
Attorney Patented Apr. 16, 1935

1,997,873

UNITED STATES PATENT OFFICE 1,997,873

DRINK MIXER

Stephen J. Poplawski, Racine, Wis.

Application October 12, 1933, Serial No. 693,264

14 Claims. (Cl. 259—108)

This invention relates to certain new and useful improvements in drink mixers for mixing malted milk and similar drinks, and refers more particularly to that type of mixer in which the agitator is carried by the container as shown and described in my copending application, Serial No. 553,057 and Serial No. 553,056, filed July 25, 1931.

It is an object of this invention to provide improved means for actuating the switch which controls the starting and stopping of the drive motor for the agitator.

At the present time, the control switch is closed automatically by the placing of the mixing container on its base and is automatically opened by the removal of the container. Also, in some instances, the switch requires manual actuation, both to its "on" and "off" positions.

These past constructions have been objectionable principally because of the probability of having the motor start before the container has been properly placed in position, and because of the possibility of accidentally starting the motor during cleaning of the mixer base.

It is, therefore, another object of this invention to provide means for actuating the switch controlling the running of the drive motor, which requires not only the presence of a mixing container in proper mixing position, but also a positive actuation of a manually operable member to effect closure of the switch, while retaining the desirable automatic opening of the switch upon removal of the mixing container.

Another object of this invention is to provide a switch and actuating mechanism therefor, compactly arranged within the container centering and holding member.

A further object of this invention is to so construct the container centering and holding member as to facilitate placing the container in position.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a view partly in vertical section and partly in elevation of a mixing device embodying this invention, and showing the base and container support with a container in position;

Figure 2 is a section view looking at the bottom of the container support and taken on the plane of the line 2—2 of Figure 1;

Figure 3 is a fragmentary side view to illustrate a structural detail of the switch actuating mechanism;

Figure 4 is a detail section view showing the manually operable member in its switch closing position; and Figure 5 is a perspective view of one of the elements forming part of the switch actuating mechanism.

Referring now more particularly to the accompanying drawing in which like numerals indicate like parts throughout the several views, the numeral 5 represents the base for the mixing machine. The base is preferably hollow to enclose a drive motor 6, only a portion of which is shown.

The top wall 7 of the base has an opening 8 therein, through which a depending tubular boss 9 formed as part of a container centering and holding member 10, projects. The motor has a hub threaded into the boss 9 so that the motor is detachably suspended from the member 10.

The member 10, which is secured to the top wall 7 of the base by screws 11, is substantially cup-shaped to receive and hold a mixing container 12. The inner wall of the cup-shaped member 10 is tapered to correspond to the taper of the mixing container and to permit the base of the container to be wedged down into the cup member so that the container may be rigidly held against turning.

At opposite sides, the upstanding wall of the cup member 10 is cut away as at 13 to permit liquid which might accumulate in the cup member to drain therefrom; and to facilitate the engagement of the container in the cup member, the rear portion of the container 14 is higher than the front portion 15. Consequently, the container may be quickly centered over the cup merely by pushing the same back against the higher rear portion.

The mixing container is of the type particularly shown and described in the aforesaid copending application, Serial No. 553,056, and has an agitator 16 built therein. The agitator is adapted to be driven from the drive motor through a detachable connection established between the shaft of the agitator and a coupling shaft 17 extending upwardly from the motor through the tubular boss 9 and a central opening 18 in the bottom of the cup member 10. It is noted that the peripheral edge portion of the opening 18 is raised above the bottom generally so as to preclude liquid which might accumulate in the cup member from flowing down through the opening 18 and onto the motor.

Besides centering and holding the mixing container, the member 10 also provides an enclosure for an electric switch indicated generally by the numeral 19, and actuating mechanism therefor. The switch is mounted in a pocket 20 formed in the rear portion 14 of the cup member and consists of two spring fingers 21 and 22 rigidly mounted on a pad 23 formed as part of the cup member. The spring fingers are insulated from each other and have contact points at their outer free ends adapted to be engaged to close the switch and complete the circuit to the motor.

The resiliency of the spring fingers normally yieldably maintains the same separated and in their open positions. To engage the same and close the switch, actuating means 24 are provided. This means comprises a draw bar 25 slidably mounted in grooves 26 and 27 in the bottom of the rear and forward portions of the cup member 10, the draw bar having its medial portion curved as at 28 to accommodate the boss 9.

The rear end of the draw bar is bent upwardly to provide a hook 29 engageable with the spring finger 21 upon forward motion of the draw bar to pull the same into contact with the finger 22. The hook 29 carries an insulating sleeve 30 to preclude electrical contact between it and the finger 21.

The front end of the draw bar 25 is directed upwardly as at 31 into a pocket 32 formed in the front of the member 10. At its upper end, the portion 31 is hooked over a cross pin 33, the ends of which are received in elongated slots 34 in the side walls 35 of the pocket 32.

Pivotally mounted on the cross pin 33 between the side walls 35 of the pocket 32, with its outer end projecting from the pocket, is a manually operable actuating member 36.

The actuating member 36 is preferably stamped from sheet metal and has spaced sides 37, the inner ends of which are enlarged and have angularly disposed bottom and rear edges 38 and 39 respectively. These edges of the actuating member side walls are engageable with outer angularly disposed faces 40 of the head 41 of a pin 42, slidably received in a bore 43 in the front wall of the cup member.

The inner end of the pin 42 is arranged to abut the adjacent portion of a container held by the container supporting and centering member, to afford a rigid support for the actuating member 36, and cooperate therewith in closing the switch as will be hereinafter described.

The actuating member 36 is yieldably held in its raised inoperative position by a coil spring 44 looped about the cross pin 33 with one end 45 thereof engaging the upwardly directed end 31 of the draw bar and its other end 46 engaging the underside of the member 36.

Without a container in position, depression of the manually operable member 36 is ineffective to close the switch. It merely turns about the axis of the cross pin 33 without in anywise affecting the position of the draw bar. However, with a container in place, as shown in Figure 1, holding the pin 42 against inward movement, depression of the manually operable member 36, besides causing rotation about the axis of the pin 33, also pulls the pin and consequently the draw bar forwardly by reason of the engagement of the inner ends of the side arms 38 with the head 41 of the pin.

It is noted that with the actuating member in its normal position, the rear edges 39 of its side walls engage one of the angular faces 40 of the pin head 41, and as illustrated in Figure 4, upon movement of the actuating member 36 to its operative switch closing position, the bottom edges 38 of its side walls engage the other angular face of the head 41, so that the actuating member is yieldably held in its depressed switch closing position.

The manually operable member 36 remains in its switch closing position as long as the container is left in place on the cup member 10, and as will be readily apparent upon removal of the container, the support for the pin 42 will be withdrawn and consequently the manually operable member 36 will be free to return to its inoperative position under action of its spring 44.

It is thus seen that closure of the switch requires a positive manual actuation of the member 36, but the opening thereof is effected automatically by the removal of the mixing container.

It is also evident that the switch cannot be closed except when a container is in place. Consequently, the objections to past structures, wherein accidental closure of the switch was possible are entirely overcome with the present invention.

What I claim as my invention is:

1. In a mixing device including a container, an agitator and an electric motor to drive the agitator, an electric switch to control the starting and stopping of the motor, and actuating means for said switch including a manually operable member at all times accessible for direct manual actuation, and means associated with the manually operable member and operatively engageable therewith by the container to hold the manually operable member in its switch closing position, whereby the presence of a container is necessary for closure of the switch.

2. In a mixing device, a container support adapted to receive and hold a mixing container, an electric motor to drive an agitator within a container placed on the support, a switch to control starting and stopping of the motor, actuating means for the switch including a part arranged to bear against a container placed on the support to be held in an operative position by the container, and means receiving support from said part when the same is in its operative position in which it is held by the container and manually operable after the placing of the container on the support to close the switch and hold the switch closed as long as it is supported by said part whereby the presence of a container on the support is necessary to enable closing of the switch and whereby removal of the container automatically opens the switch.

3. In a mixing device including a container, an agitator and an electric motor to drive the agitator, a support to receive and hold a container in mixing position, a switch to control starting and stopping of the motor, and means to actuate the switch including a part rendered operative by the placing of a container on the support, and a manually operable element cooperable with said part and operable after said part has been rendered operative by the placing of a container on the support to close and hold the switch closed as long as a container is in place on the support whereby closure of the switch requires manual actuation and opening thereof is automatic with the removal of the container.

4. In a mixing device including a container, an agitator and an electric motor to drive the agitator, a support for the container, an electric switch to control the starting and stopping of the motor, and actuating means for the switch comprising a manually operable member, means mounting the manually operable member for movement in two directions, movement of said member in one direction being effected by manual actuation thereof, means to connect the manually operable member with the switch to close the same upon movement thereof in the other direction, and an element arranged to abut a container on the support and to impart said other movement to the manually operable member upon manual actuation thereof and to hold the manually operable member in its switch closing position as long as a container is on the support.

5. In a mixing device including a container, an agitator and an electric motor to drive the agitator, a support for the container, an electric switch to control the starting and stopping of the motor, and means to actuate said switch comprising a manually operable element mounted for two different motions, a connection between the manually operable element and the switch adapted upon one motion of the manually operable element to close the switch, and means on the manually operable element adapted to receive support from a container on the support and shaped so as to impart said motion to the manually operable element upon actuation thereof to effect its other motion.

6. In a mixing device including a container, an agitator and an electric motor to drive the agitator, a support for the container, an electric switch to control the starting and stopping of the motor, and means to actuate said switch comprising a manually operable element mounted for two different motions, a connection between the manually operable element and the switch adapted upon one motion of the manually operable element to close the switch, means on the manually operable element adapted to receive support from a container on the support and shaped so as to impart said motion to the manually operable element upon actuation thereof to effect its other motion, and means to return the manually operable member and the connection between it and the switch to their inactive positions upon removal of the container.

7. In a mixing device including a container, an agitator and an electric motor to drive the agitator, an electric switch to control the starting and stopping of the motor, a support for the container, and means to actuate the switch comprising a manually operable member mounted for pivotal and linear motion, means to connect the manually operable member with the switch to close the switch upon linear motion of the manually operable member, and means arranged to abut the container and to impart linear motion to the manually operable member upon pivotal movement thereof and to hold the manually operable member in its switch closing position until the container is removed from the support.

8. In a mixing device including a container, an agitator and an electric motor to drive the agitator, a support for the container, an electric switch biased to open position and adapted to control the starting and stopping of the motor, and actuating means for the switch comprising a manually operable element mounted for pivotal and linear motion, means to connect the manually operable element with the switch to close the switch upon linear movement of the manually operable member, and means on the manually operable member adapted to receive support from a container on the support to effect linear motion of the manually operable element upon pivotal movement thereof and to hold the manually operable element in its switch closing position until the container is removed from the support.

9. In a mixing device including a container, an agitator and a motor for the agitator, a support for the container, a switch to control the starting and stopping of the motor, said switch being biased to open position, and means to actuate the switch comprising a manually operable element mounted for pivotal and linear movement, the pivotal movement being effected by the direct application of manual force on the manually operable member, a connection between said manually operable element and the switch to close the switch upon linear movement of said manually operable element, and cooperating means carried by the container support and the manually operable element to effect linear movement of the manually operable element upon pivotal movement thereof when a container is in place on the support.

10. In a mixing device including a container, an agitator and a motor for the agitator, a support for the container, a switch to control the starting and stopping of the motor, said switch being biased to open position, and means to actuate the switch comprising a manually operable element mounted for pivotal and linear movement, the pivotal movement being effected by normal manual actuation, a connection between said manually operable element and the switch to close the switch upon linear movement of said manually operable element, cooperating means carried by the container support and the manually operable element to effect linear movement of the manually operable element upon pivotal movement thereof when a container is in place on the support, and yieldable means to return the manually operable element to its inoperative position upon removal of the container from its support.

11. In a mixing device including a container, an agitator and an electric motor to drive the agitator, a cup member to receive and hold the container in mixing position, said cup member having a pocket in its under side, an electric switch to control the starting and stopping of the motor mounted in said pocket, said switch being biased to open position, and means to actuate the switch comprising, a manually operable element mounted on the cup member for pivotal and linear motion, a member connecting the switch with the manually operable element to close the switch upon linear movement of said element without interfering with the pivotal movement thereof, a pin slidable in the cup member with one end arranged to abut a container received therein, and means on the manually operable element to engage the opposite end portion of the pin to effect linear movement of said element upon pivotal movement thereof while the pin abuts a container and to hold the manually operable element in its switch closing position until the container is removed.

12. In a mixer including a container to hold the materials to be mixed, an agitator and an electric motor to drive the agitator, a support for the container, an electric switch to control the starting and stopping of the motor, and means to actuate said switch, said means having a part at all times accessible for manual operation and another part biased to inoperative position and adapted to be held by a container on the support in an operative position co-acting with the manually operable part to hold said switch closed, whereby the switch actuating means is effective to close the switch only when a container is in place on the support and whereby said switch is automatically opened upon removal of the container.

13. In a mixing device including a container, an agitator and an electric motor to drive the agitator, a support for the container adapted to firmly engage the outside of the base of the container and hold the same in mixing position, an electric switch mounted within the support and adapted to control the starting and stopping of the motor, and actuating means for the switch mounted within the support and including a manually operable pivoted lever projecting laterally out from the support and consequently extending beyond the circumference of the container base to be accessible at all times, and readily operable by downward pressure of the hand used to place the container on the support, and means on said pivoted lever adapted to receive support from a container in position to hold the pivoted lever in its switch closing position.

14. In a mixing device including a container, an agitator and an electric motor to drive the agitator, a cup-like support to receive and hold the container, an electric switch to control the starting and stopping of the motor mounted within the cup-like support at the rear thereof, and means to actuate the switch including a readily depressible pivoted lever projecting radially from the front of the cup-like container, said lever extending beyond the circumference of the container base to be accessible at all times and engageable by the side of the hand for depression thereby during the placing of the container on the support, and means on the pivoted lever adapted to receive support from a container in position to hold the pivoted lever in its switch closing position.

STEPHEN J. POPLAWSKI.